Sept. 19, 1967 G. BATE ETAL 3,342,633

MAGNETIC COATING

Filed Aug. 5, 1964 2 Sheets-Sheet 1

INVENTORS
GEOFFREY BATE
DENNIS E. SPELIOTIS
JOHN R. MORRISON
BY George O. Saile
ATTORNEY United States Patent Office 3,342,633

Patented Sept. 19, 1967

3,342,633

MAGNETIC COATING

Geoffrey Bate and Dennis E. Speliotis, Poughkeepsie, and John R. Morrison, Wappingers Falls, N.Y., assignors to International Business Machines Corporation, New York, N.Y., a corporation of New York Filed Aug. 5, 1964, Ser. No. 387,611

9 Claims. (Cl. 117—217)

Figure 1:
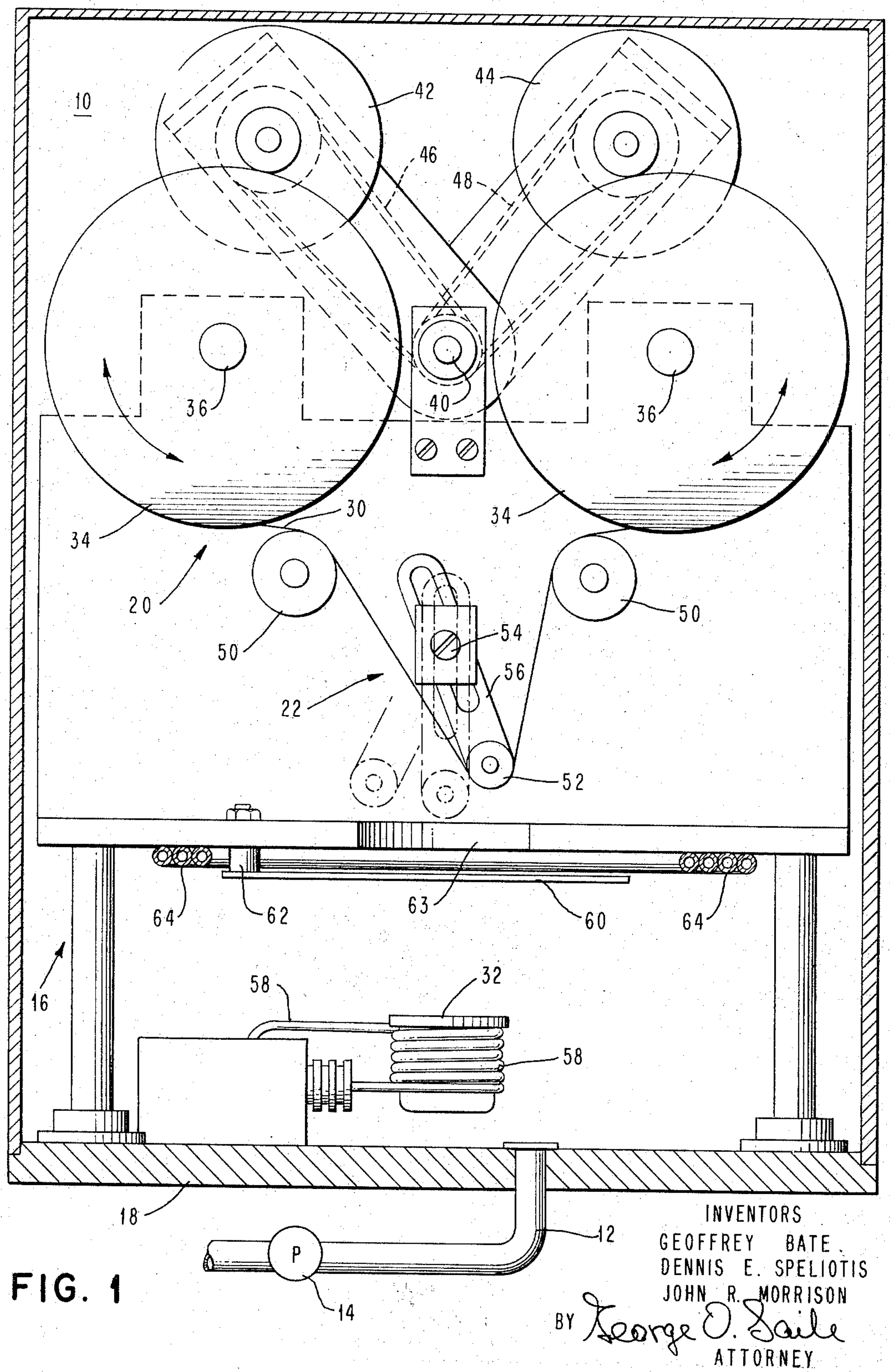

This invention relates to vacuum deposited ferromagnetic films having high coercivities, and more particularly to methods for producing magnetic recording surfaces by a vacuum deposition process which allows the control of the isotropy of the magnetic surface.

Magnetic recording devices in the form of a thin film of magnetic material in a substrate such as a tape, drum, disc, loop surface and the like are extensively used in computer and data processing systems. The most extensively used magnetic coating is a finely divided ferric oxide dispersion in a binder composition. The electrodeposited ferromagnetic film such as cobalt-nickel alloy films have also found use where high-density data storage is required. Electroless plated cobalt or a cobalt-nickel alloy film have also found limited use as a magnetic layer for magnetic recording devices.

Vacuum deposition of ferromagnetic metallic layers have been used extensively in the production of low coercivity, or soft magnetic layers, which are useful as bistable devices. Vacuum evaporation techniques have been suggested for the production of high coercivity or hard magnetic films for magnetic recording devices. The copending patent application Ser. No. 387,589, filed Aug. 5, 1964 simultaneously with this application, and assigned to the same assignee as the present patent application discloses methods for producing magnetic films having sufficiently high coercivity for use as a magnetic recording device.

Extensive work has been performed to produce isotropy in the soft magnetic films which are typically 80 percent nickel and 20 percent iron alloy. Rotating a magnetic field during the deposition of the soft magnetic material onto a suitable substrate has been used to produce isotropic films. The U.S. Patent 3,047,423, patented July 31, 1962, assigned to the same assignee as the present patent application, discloses a method for producing isotropic soft magnetic film elements by using an annealing technique. These techniques, while able to produce isotropy in low coercivity magnetic films, are not conveniently able to produce a controlled amount of anisotropy in high coercivity vacuum deposited films. Peak shift and output in recording depend directly on the anisotropy of the recording surface. Being able to control the anisotropy of the surface allows the optimization of the output and high density performance of the recording medium.

It is thus an object of this invention to provide a method for vacuum depositing high coercivity magnetic films having a controlled anisotropy.

It is another object of this invention to provide a method for vacuum depositing a magnetic cobalt, iron or nickel thin film having a coercivity of greater than 100 oersteds and having a controlled anisotropy.

It is another object of this invention to provide a method for vacuum depositing a magnetic cobalt, iron or nickel thin film having a coercivity of greater than 100 oersteds and being isotropic.

These and other objects are accomplished in accordance with the broad aspects of the present invention by providing a method which includes a two layer vacuum deposition. The first layer is produced by heating a body of ferromagnetic metal to a temperature sufficiently high to volatilize the metal within a vacuum chamber and the evaporated metal is directed and condensed onto a suitable substrate. The first layer is deposited at normal incidence. The cooling of this first ferromagnetic layer is critical. Where an isotropic magnetic film is desired, this ferromagnetic layer is cooled in an oxygen containing cooling atmosphere to room temperature from a temperature of at least 150° C. However, where anisotropy in the film is desired, the first layer of condensed metal is cooled in an inert environment to a temperature of about 60° C. or less prior to exposure to any oxygen containing atmosphere. The second ferromagnetic layer is vacuum deposited onto the first layer by heating a body of ferromagnetic metal to volatilize the metal, and directing and condensing the metal onto the first layer at an angle of incidence of greater than about 45 degrees from the normal to the substrate. The second layer is then cooled substantially to room temperature in a non-oxidizing atmosphere. The thickness of the second layer controls the anisotropy of the overall film where the first layer had been cooled in an inert environment to a temperature of less than about 60° C. An increase in thickness up to the point of approximately 300 Angstrom units produces increased anisotropy.

Figure 2:
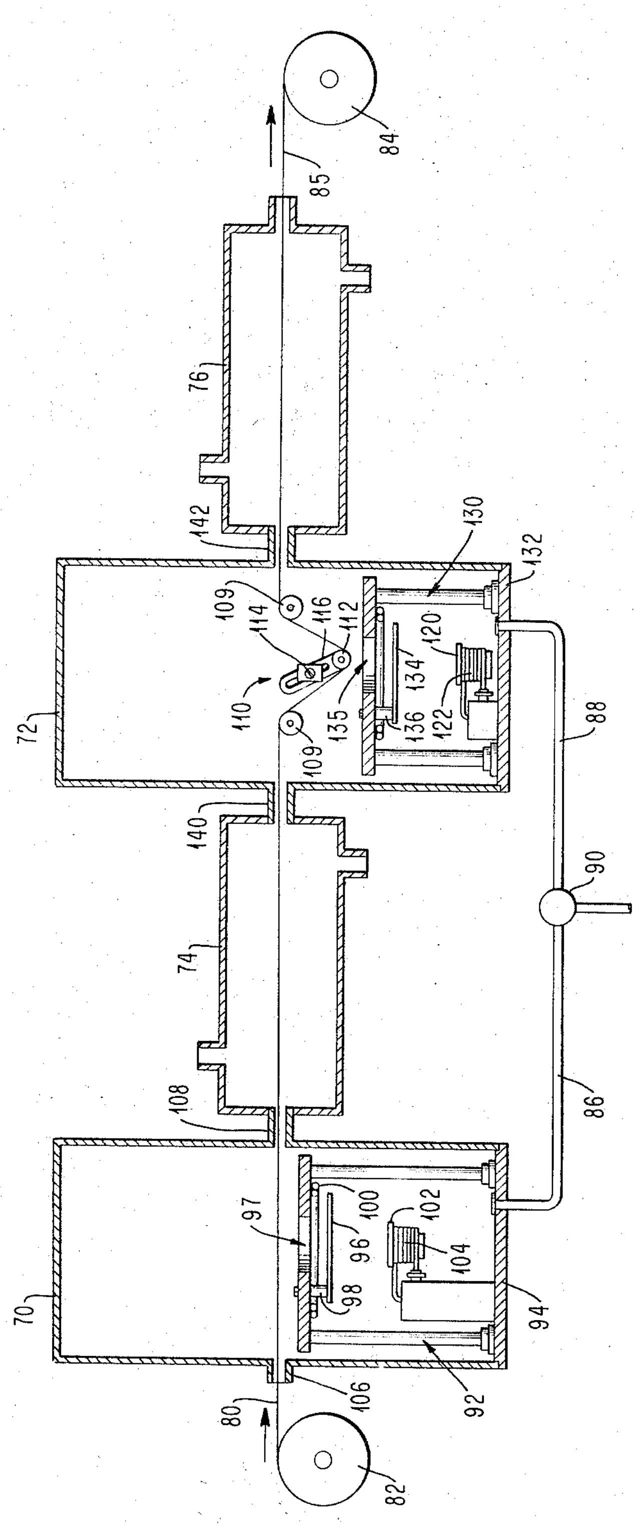

The foregoing and other objects, features and advantages of the present invention will be apparent from the following more particular description of the preferred embodiments of the invention as illustrated in the accompanying drawings:

In the drawings:

FIGURE 1 is an illustration of an apparatus useful in performing the vacuum evaporation method of the present invention; and FIGURE 2 is a schematic illustration of a second apparatus for performing the vacuum evaporation method of the present invention in a continuous manner.

Referring now more particularly to FIGURE 1 there is shown an apparatus for producing a high coercivity magnetic recording tape by vacuum evaporation. The substrate to be coated is located in a vacuum chamber 10 which is connected by means of pipe 12 to a pump 14 capable of creating the desired vacuum in the vacuum chamber. Within the chamber there is a supporting structure which is generally indicated as 16 which rests upon the base 18 of the vacuum chamber 10. The support structure 16 supports the means 20 for moving the tape to be coated and the means 22 for adjusting the angle of incidence of the vacuum deposit applied to the tape.

The means 20 for moving the tape 30 past the vessel 32 containing a mass of ferromagnetic metal to be evaporated includes a pair of tape reels 34 which are mounted on hubs 36 that are attached to the supporting structure 16. One of the reels 34 is loaded with uncoated tape of a suitable composition while the second reel is the empty take-up reel. The tape reels 34 are driven by a drive shaft 40 by means of motors 42 or 44 connected to the drive shaft 40 by belts 46 and 48. The tape reels may be driven in one direction or the other by means of motors 42 and 44 together with their mechanical linkages to the hubs 36. In this way the tape can be coated with several layers of vacuum deposited material without interrupting the vacuum in the vacuum chamber 10.

The tape 30 passes over idler rollers 50 and over means 22 for adjusting the angle of incidence of the volatilized ferromagnetic metal stream. The means 22 is illustrated as an adjustable idler roller 52 fixedly supported on a bolt 54, adjustable element 56. The idler roller 52 can be moved to any desired location within a wide range of locations by loosening the bolt 54, adjusting the element 56 to the desired location and simply tightening the bolt 54. The distance from the vessel 32 containing the molten metal is also adjustable by the means 22.

The body of ferromagnetic metal in the vessel 32 is made molten by means of heat supplied by the induction coil 58. The temperature is then increased by means of additional induction heating of the vessel 32 and the metal is volatilized in the direction of the tape 30. A shield 60 mounted on the supporting structure 16 by bolting means 62 acts together with the opening 63 in the support structure 16 to limit the area of the tape exposed to the condensation of the volatilized metal. Copper cooling coil 64 on the support structure maintains the supporting structure substantially at about room temperature. The shield 60 additionally shields the tape surface from undue heat exposure from the vessel 32 and its induction heater 58.

The FIGURE 1 apparatus may be used to produce either an isotropic film or a regulated anisotropic film. In either case, a layer of ferromagnetic metal is condensed in a vacuum onto a suitable substrate at a substantially normal angle of incidence to form a first ferromagnetic layer. The FIGURE 1 apparatus illustrates the manner in which a continuous web 30 of tape can be continuously coated with the ferromagnetic layer. The tape 30 is driven past the opening in the shield 60 to produce the ferromagnetic coated layer uniformly on the tape 30. The tape may be driven back and forth past the opening as many times as desired. After the tape 30 has been coated to the desired thickness of ferromagnetic layer, the heat supplied to the induction coil 58 is removed and vacuum evaporation discontinued. The preferred thickness of the first ferromagnetic layer is between about 100 to 1000 angstrom units. The champer and the ferromagnetic layer on the tape 30 is allowed to cool preferably while the vacuum is maintained within the chamber 10. Air or another oxygen containing atmosphere is then allowed to enter the chamber 10 to bring the first ferromagnetic layer to room temperature.

The first ferromagnetic layer's temperature when the oxidizing atmosphere is admitted to the chamber determines whether the ultimate product is isotropic or anisotropic. If the condensed ferromagnetic metal layer is at a temperature of greater than about 150° C., the resulting product is isotropic. However, if the temperature of the condensed ferromagentic layer is below about 60° C., the cooling with an oxidizing atmosphere to room temperature does not render the product isotropic. The reason for these physical effects is not fully understood. It is known, however, that the process is not just an ordinary oxidation process because the precise order of method steps are required to produce the product layer of controlled anisotropy.

The chamber is then again evacuated and a second ferromagnetic layer is applied over the first layer by vacuum deposition. In this case, the means 22 for adjusting the angle of incidence of the vacuum deposit applied to the tape is adjusted so that the angle of incidence is greater than about 45 degrees. The thickness of the second ferromagnetic layer determines the anisotropy for the product which had its first ferromagnetic layer unexposed to an oxidizing atmosphere until its temperature was reduced below about 60° C. The greater the thickness of the second ferromagnetic layer, the greater the anisotropy. It is preferred to have the thickness of the anisotropic second ferromagnetic layer between about 300 and 1000 angstrom units. Above about 1000 angstrom units is undesirable because of possible demangnetizing effects. For the case of the product which has had its first ferromagnetic layer exposed to an oxidizing atmosphere above about 150° C., the product will be isotropic regardless of the thickness of the second ferromagnetic layer. The ferromagnetic layer's exposure to air or other oxidizing atmosphere above about 150° C. produces a partially oxidized film. The reason, however, for the characteristic of isotropy in the ferromagnetic composite layers regardless of the thickness of the second layer is not understood. It is preferred that the isotropic second ferromagnetic layer have a thickness of 500 to 1000 angstrom units to produce optimum recording performance. Exposures of the first ferromagnetic layer to temperatures of between about 60° C. and 150° C. to an oxidizing atmosphere produce intermediate effects.

FIGURE 2 is a schematic illustration of an apparatus for continuously producing magnetic tape which is either isotropic or anisotropic to a controllable degree. The apparatus includes two vacuum chambers 70 and 72, and two cooling chambers 74 and 76. A continuous length of tape substrate 80 is fed through the vacuum and cooling chambers from a supply roll 82 to a pickup roll 84 for the magnetic tape product 85. The vacuum chambers 70 and 72 are connected by means of pipes 86 and 88 to a vacuum pump 90 capable of creating the desired vacuum in the vacuum chambers. Within the chamber 70 there is a supporting structure which is generally indicated as 92 that rests upon the base 94 of the vacuum chamber 70. The support structure 92 has mounted on it a shield 96 by bolting means 98. The shield 96 together with the opening 97 in support structure 92 acts to limit the area of the tape exposed to the condensation of volatilized metal. A copper cooling coil 100 on the support structure maintains the supporting structure substantially at about room temperature. The shield 96 additionally shields the tape surface from undue heat.

A body of ferromagnetic metal is placed in the vessel 102 wherein it is made molten and then evaporated by means of heat supplied by the induction coil 104. The first ferromagnetic layer is applied to the tape substrate 80 in vacuum chamber 70 at a substantially normal angle of incidence. The tape passes into and out of vacuum chamber 70 through air locks 106 and 108 respectively. The tape then passes into the cooling chamber 74 which may cantain an inert or oxidizing atmosphere depending upon the desired isotropy or anisotropy of the product.

The tape then passes into vacuum chamber 72 wherein a second ferromagnetic layer is applied over the first ferromagnetic layer. The tape passes around idler rollers 109 and the means 110 for adjusting the angle of incidence of the vacuum deposit applied to the tape. The angle of incidence required for this second ferromagnetic layer is greater than about 45 degrees from the normal to the substrate. The means 110 is illustrated as an adjustable idler roller 112 fixedly supported on a bolt 114, adjustable element 116. The idler roller 112 can be moved to any desired location within a wide range of locations by loosening the bolt 114, adjusting the element 116 to the desired location and simply tightening the bolt 114. The distance from the vessel 120 containing the molten metal is also adjustable by the means 110. The supporting structure within the chamber is indicated by 130 and it rests upon the base 132 of the vacuum chamber 72. The support 130 supports the shield 134 which is attached to the support structure by bolting means 136. The shield 134 together with opening 135 in the support structure limits the exposed tape area for vacuum deposition. The body of ferromagnetic metal placed in the vessel 120 is made molten by means of heat supplied by the induction coil 122. The temperature is then increased by means of additional induction heating of the vessel 120 and the metal is volatilized in the direction of the tape upon which it condenses. The tape enters and exits from the vacuum chamber 72 through airlocks 140 and 142 respectively. The tape then goes through the cooling chamber 76 wherein the ferromagnetic layers are cooled to a temperature preferably below about 60° C. The magnetic tape product 85 is then wound upon take-up roller 84. The tape is propelled through the vacuum chambers and cooling chambers by means of drive means (not shown) on the take-up roller, on the supply roller or on both rollers.

The ferromagnetic metals which may be used according to the method are the pure cobalt, iron or nickel; an alloy of cobalt and iron; or cobalt and iron alloys with nickel. The nickel-iron alloy between about 75 to 85 percent by weight nickel and about 25 to 15 percent by weight iron is excluded because of its extremely low coercivity characteristic. When nickel is alloyed with iron or cobalt, the resulting alloy has a decreased remanent moment and a decreased demagnetizing field.

The following examples are included merely to aid in the understanding of the invention and variations may be made by one skilled in the art without departing from the spirit of the invention.

*Example 1*

An apparatus similar to the FIGURE 1 apparatus was used except the film was held stationary and the vessel induction heater was replaced with a tungsten resistance filament. Onto the resistance filament was placed 10 grams of high purity iron in several pieces. The substrate was polyethylene terethphalate film. The vacuum chamber was evacuated to $1.4 \times 10^{-5}$ mm. of mercury. The metal was heated for 15 minutes at a relatively low temperature to allow for out-gassing of all impurities before the actual evaporation was to take place. The substrate was so placed that the volatilized metal stream would strike the substrate at a normal angle of incidence. The shield was moved so that the opening for the volatilized stream of metal was in position for the desired flow of volatilized metal. The temperature of the filament was increased and the iron evaporated. Heat was removed from the vacuum source and the temperature of the chamber and the first condensed ferromagnetic layer brought to below 60° C. Air was then admitted to the chamber. The chamber was then evacuated a second time after another ten grams of high purity iron in several pieces were placed upon the resistance filament. The substrate was placed during this second evaporation so that the volatilized metal stream would strike the substrate at an 80 degree angle of incidence from the normal to the substrate. The vacuum chamber was evacuated to $1.1 \times 10^{-5}$ mm. of mercury. The metal was out-gassed at a relatively low temperature for 15 minutes. The shield was moved so that the opening for the volatilized stream of metal was in position to allow the desired flow of volatilized metal. The temperature of the filament was increased and the iron evaporated. The evaporated film was allowed to cool in the chamber for approximately 3 minutes until its temperature was below 60° C. The resulting film was continuus and bright in appearance. The substrate had a variation in thickness because it was stationary rather than moving as illustrated in FIGURE 1. The thickest portion was $7.25 \times 10^{-3}$ e.m.u. as expressed by the remanent magnetic moment, $M_r$, or 655 angstrom units, an intermediate thickness was $4.1 \times 10^{-3}$ e.m.u. or 370 angstrom units and the thinnest coating was $1.55 \times 10^{-3}$ e.m.u. or 140 angstrom units. The thicknesses are overall thicknesses for both the first and second ferromagnetic films. Table I indicates the coercivities for the various thicknesses of ferromagnetic layer.

TABLE I

| Example | | Thickness | | Coercivity $H_c$ | |
|---|---|---|---|---|---|
| | | In e.m.u. | In A. | Perpendicular To The Incident Plane | Parallel To The Incident Plane |
| 1 | | $1.55 \times 10^{-3}$ | 140 | 164 | 164 |
| | | $4.1 \times 10^{-3}$ | 370 | 191 | 257 |
| | | $7.25 \times 10^{-3}$ | 655 | 159 | 277 |
| 2 | 1st layer | $1.55 \times 10^{-3}$ | 140 | 142 | 142 |
| | Final | $2.5 \times 10^{-3}$ | 225 | 150 | 157 |
| | Final | $4.35 \times 10^{-3}$ | 395 | 181 | 210 |
| 3 | 1st layer | $4.9 \times 10^{-3}$ | 445 | 120 | 120 |
| | Final | $6.6 \times 10^{-3}$ | 600 | 150 | 150 |
| | 1st layer | $9.5 \times 10^{-3}$ | 800 | 131 | 131 |
| | Final | $11.3 \times 10^{-3}$ | 1,000 | 123 | 132 |

*Example 2*

The Example 1 was repeated using high purity cobalt metal. The initial vacuum was $0.6 \times 10^{-6}$ and the vacuum for the second evaporation was $2.7 \times 10^{-6}$. The thickness and coercivity of the first ferromagnetic layer and the final product were determined and are given in Table I.

*Example 3*

The Example 1 was repeated using high purity cobalt metal except that after the first evaporation air was immediately allowed to enter the vacuum chamber. The temperature of the condensed metal when the air was allowed to enter the chamber was approximately 245° C. The ferromagnetic layer was allowed to cool to room temperature. The second ferromagnetic layer was then deposited by the technique explained in Example 1 and the product was cooled in the vacuum chamber to below 60° C. while maintaining the vacuum in the chamber. Table I gives the coercivity values at representative thicknesses along the length of the substrate for the first ferromagnetic layer and for the final composite of the first and second layers.

While the invention has been particularly shown and described with reference to the preferred embodiments thereof, it will be understood by those skilled in the art that the foregoing and other advantages in form and detail may be made therein without departing from the spirit and scope of the invention.

What is claimed is:

1. The method of fabricating a high coercivity magnetic surface having controlled anisotropy comprising:
heating a body of ferromagnetic metal in a vacuum to a temperature sufficiently to volatilize the said metal;
directing and condensing said volatilized metal onto a suitable substrate at a substantially normal angle of incidence to form a first ferromagnetic layer;
cooling said condensed metal to room temperature;
vacuum depositing a second ferromagnetic layer onto said first layer by heating a body of ferromagnetic metal to volatilize said metal, and directing and condensing said metal onto said first layer at an angle of incidence of greater than about 45 degrees from the normal to said substrate; and
cooling said deposited second layer substantially to room temperature in a non-oxidizing atmosphere.

2. The method of fabricating a high coercivity magnetic surface having controlled anisotropy comprising:
heating a body of ferromagnetic metal in a vacuum to a temperature sufficiently high to volatilize the said metal;
directing and condensing said volatilized metal onto a suitable substrate at a substantially normal angle of incidence to form a first ferromagnetic layer;
cooling said condensed metal in an inert environment to a temperature of less than about 60° C.;
exposing said condensed metal to an oxygen containing cooling atmosphere to bring said condensed metal to room temperature;
vacuum depositing a second ferromagnetic layer onto said first layer by heating a body of ferromagnetic metal to volatilize said metal, and directing and condensing said metal onto said first layer at an angle of incidence of greater than about 45 degrees from the normal to said substrate; and
cooling said deposited second layer substantially to room temperature in a non-oxidizing atmosphere.

3. An anisotropic magnetic recording surface made by the method of claim 2.

4. The method of fabricating an isotropic, high coercivity magnetic surface comprising:
heating a body of ferromagnetic metal to a temperature sufficiently high to volatilize the said metal in a vacuum;
directing and condensing said volatilized metal onto a suitable substrate at a substantially normal angle of incidence to form a first ferromagnetic layer;
exposing said condensed metal to an oxygen containing cooling atmosphere when said condensed metal is at a temperature of at least 150° C to bring said condensed metal to room temperature;

vacuum depositing a second ferromagnetic layer onto said first layer by heating a body of ferromagnetic metal to volatilize said metal, and directing and condensing said metal onto said first layer at an angle of incidence of greater than about 45 degrees from the normal to said substrate; and cooling said deposited second layer substantially to room temperature in a non-oxidizing atmosphere.

5. An isotropic magnetic recording surface made by the method of claim 4.

6. The method of fabricating an isotropic, high coercivity magnetic surface comprising;

heating a body of ferromagnetic metal in a vacuum to a temperature sufficiently high to volatilize the said metal in a vacuum;

directing and condensing said volatilized metal onto a suitable substrate at a substantially normal angle of incidence to form a first ferromagnetic layer having a thickness of about 100 to 1000 angstrom units;

cooling said condensed metal in an inert environment to a temperature which is greater than about 150° C.;

exposing said condensed metal to an oxygen containing cooling atmosphere to bring said condensed metal from above about 150° C. to room temperature;

vacuum depositing a second ferromagnetic layer onto said first layer by heating a body of ferromagnetic metal to volatilize said metal, and directing and condensing said metal onto said first layer at an angle of incidence of greater than about 45 degrees from the normal to said substrate; and cooling said deposited second layer substantially to room temperature in a non-oxidizing atmosphere.

7. The method if fabricating a high coercivity magnetic surface having controlled anisotropy comprising:

heating a body of ferromagnetic metal in a vacuum to a temperature sufficiently high to volatilize the said metal;

directing and condensing said volatilized metal onto a suitable substrate at a substantially normal angle of incidence to form a first ferromagnetic layer having a thickness of about 100 to 1000 angstrom units;

cooling said condensed metal in an inert environment to a temperature of less than about 60° C.;

exposing said condensed metal to an oxygen containing cooling atmosphere to bring said condensed metal to room temperature;

vacuum depositing a second ferromagnetic layer onto said first layer by heating a body of ferromagnetic metal to volatilize said metal, and directing and condensing said metal onto said first layer at an angle of incidence of greater than about 45 degrees from the normal to said substrate;

said second layer being between about 300 and 1000 angstrom units in thickness; and cooling said deposited second layer substantially to room temperature in a non-oxidizing atmosphere.

8. The method of fabricating an isotropic, high coercivity magnetic surface comprising:

heating in a vacuum a body of ferromagnetic metal from the group consisting of cobalt, iron, nickel, cobalt-nickel alloys, cobalt-iron alloys and a nickel-iron alloy between about 1 to 74 and 86 to 99 percent by weight nickel and the remaining portion iron to a temperature sufficiently high to volatilize the said metal;

directing and condensing said volatilized metal onto a suitable substrate at a substantially normal angle of incidence to form a first ferromagnetic layer having a thickness of about 100 to 1000 angstrom units;

cooling said condensed metal in an inert environment to a temperature which is greater than about 150° C.;

exposing said condensed metal to an oxygen containing cooling atmosphere to bring said condensed metal to room temperature;

vacuum depositing a second ferromagnetic layer onto said first layer by heating in a vacuum a body of ferromagnetic metal from the group consisting of cobalt, iron, nickel, cobalt-nickel alloys, cobalt-iron alloys and a nickel-iron alloy between about 1 to 74 and 86 to 99 percent by weight and the remaining portion iron to volatilize said metal, and directing and condensing said metal onto said first layer at an angle of incidence of greater than about 45 degrees from the normal to said substrate;

said second layer being greater than 100 angstrom units in thickness; and cooling said deposited second layer substantially to room temperature in a non-oxidizing atmosphere.

9. The method of fabricating a high coercivity magnetic surface having controlled anisotropy comprising:

heating a body of ferromagnetic metal from the group consisting of cobalt, iron, nickel, cobalt-nickel alloys, cobalt-iron alloys and a nickel-iron alloy between about 1 to 74 and 86 to 99 percent by weight nickel and the remaining portion iron in a vacuum to a temperature sufficiently high to volatilize the said metal;

directing and condensing said volatilized metal onto a suitable substrate at a substantially normal angle of incidence to form a first ferromagnetic layer having a thickness of about 100 to 1000 angstrom units;

cooling said condensed metal in an inert environment to a temperature of less than about 60° C.;

exposing said condensed metal to an oxygen containing cooling atmosphere to bring said condensed metal to room temperature;

vacuum depositing a second ferromagnetic layer onto said first layer by heating a body of ferromagnetic metal from the group consisting of cobalt, iron, nickel, cobalt-nickel alloys, cobalt-iron alloys and and a nickel-iron alloy between about 1 to 74 and 86 to 99 percent by weight nickel and the remaining portion iron to volatilize said metal, and directing and condensing said metal onto said first layer at an angle of incidence of greater than about 45 degrees from the normal to said substrate;

said second layer being between about 300 and 1000 angstrom units in thickness; and cooling said deposited second layer substantially to room temperature in a non-oxidizing atmosphere.

References Cited

UNITED STATES PATENTS

| | | | |
|---|---|---|---|
| 2,853,402 | 9/1958 | Blois | 117—240 X |
| 2,999,766 | 9/1961 | Ashworth et al. | 117—236 X |
| 3,047,423 | 7/1962 | Eggenberger et al. | 117—107 |
| 3,065,105 | 11/1962 | Pohm | 117—236 X |

ALFRED L. LEAVITT, *Primary Examiner.*

A. GOLIAN, *Assistant Examiner.*

UNITED STATES PATENT OFFICE

CERTIFICATE OF CORRECTION

Patent No. 3,342,633 September 19, 1967

Geoffrey Bate et al.

It is hereby certified that error appears in the above numbered patent requiring correction and that the said Letters Patent should read as corrected below.

Column 3, line 28, for "champer" read -- chamber --; line 62, for "demangnetizing" read -- demagnetizing --; column 4, line 32, for "cantain" read -- contain --; column 5, line 42, for "continuus" read -- continuous --; column 6, line 27, after "sufficiently" insert -- high --; column 7, line 33, for "if" read -- of --; column 8, line 15, after "weight" insert -- nickel --.

Signed and sealed this 22nd day of October 1968.

(SEAL)
Attest:

Edward M. Fletcher, Jr.
Attesting Officer

EDWARD J. BRENNER
Commissioner of Patents